US006338122B1

(12) United States Patent
Baumgartner et al.

(10) Patent No.: US 6,338,122 B1
(45) Date of Patent: Jan. 8, 2002

(54) NON-UNIFORM MEMORY ACCESS (NUMA) DATA PROCESSING SYSTEM THAT SPECULATIVELY FORWARDS A READ REQUEST TO A REMOTE PROCESSING NODE

(75) Inventors: Yoanna Baumgartner; Mark Edward Dean; Anna Elman, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,351

(22) Filed: Dec. 15, 1998

(51) Int. Cl.$^7$ .......................... G06F 12/00; G06F 13/00
(52) U.S. Cl. .................. 711/141; 711/100; 711/124; 711/147; 711/154
(58) Field of Search ................... 711/124, 122, 711/154, 141, 100, 147

(56) References Cited

U.S. PATENT DOCUMENTS

| 5,754,877 | A | * | 5/1998 | Hagersten et al. | ............ 712/29 |
| 5,892,970 | A | * | 4/1999 | Hagersten | ...................... 710/5 |
| 5,950,226 | A | * | 9/1999 | Hagersten et al. | .......... 711/124 |
| 5,958,019 | A | * | 9/1999 | Hagersten et al. | .......... 709/400 |

FOREIGN PATENT DOCUMENTS

| EP | 0379771 A2 | 8/1990 |
| EP | 0608638 A1 | 8/1994 |
| EP | 0817072 A2 | 1/1998 |

* cited by examiner

Primary Examiner—Tuan V. Thai
(74) Attorney, Agent, or Firm—Casimer K. Salys; Bracewell & Patterson, L.L.P.

(57) ABSTRACT

A non-uniform memory access (NUMA) computer system includes at least a local processing node and a remote processing node that are each coupled to a node interconnect. The local processing node includes a local interconnect, a processor and a system memory coupled to the local interconnect, and a node controller interposed between the local interconnect and the node interconnect. In response to receipt of a read request from the local interconnect, the node controller speculatively transmits the read request to the remote processing node via the node interconnect. Thereafter, in response to receipt of a response to the read request from the remote processing node, the node controller handles the response in accordance with a resolution of the read request at the local processing node. For example, in one processing scenario, data contained in the response received from the remote processing node is discarded by the node controller if the read request received a Modified Intervention coherency response at the local processing node.

24 Claims, 8 Drawing Sheets

NON-UNIFORM MEMORY ACCESS (NUMA) DATA PROCESSING SYSTEM THAT SPECULATIVELY FORWARDS A READ REQUEST TO A REMOTE PROCESSING NODE

BACKGROUND OF THE INVENTION

1. Technical Field

The present invention relates in general to a method and system for data processing and, in particular, to data processing within a non-uniform memory access (NUMA) data processing system. Still more particularly, the present invention relates to a NUMA data processing system and method of communication in a NUMA data processing system in which read requests are speculatively forwarded to remote memory.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the latency associated with communication transactions transmitted via the interconnect coupling the nodes. In particular, read transactions, which are by far the most common type of transaction, may have twice the latency when targeting data resident in remote system memory as compared to read transactions targeting data resident in local system memory. Because of the relatively high latency associated with read transactions transmitted on the nodal interconnect versus read transactions on the local interconnects, it is useful and desirable to reduce the latency of read transactions transmitted over the nodal interconnect.

SUMMARY OF THE INVENTION

In accordance with the present invention, a non-uniform memory access (NUMA) computer system includes at least a local processing node and a remote processing node that are each coupled to a node interconnect. The local processing node includes a local interconnect, a processor and a system memory coupled to the local interconnect, and a node controller interposed between the local interconnect and the node interconnect. In response to receipt of a read request from the local interconnect, the node controller speculatively transmits the read request to the remote processing node via the node interconnect. Thereafter, in response to receipt of a response to the read request from the remote processing node, the node controller handles the response in accordance with a resolution of the read request at the local processing node. For example, in one processing scenario, data contained in the response received from the remote processing node is discarded by the node controller if the read request received a Modified Intervention coherency response at the local processing node.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
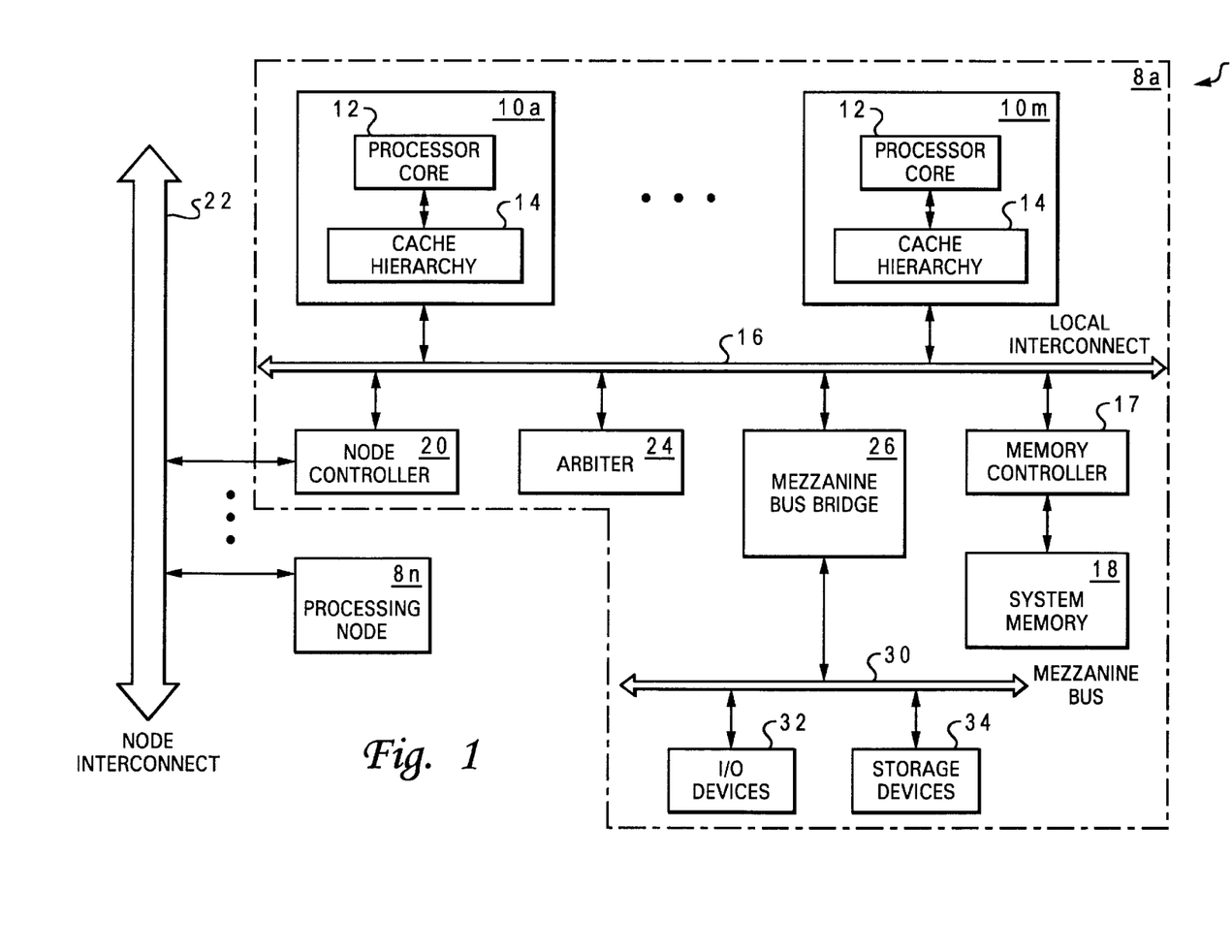
FIG. 1 depicts an illustrative embodiment of a NUMA computer system in accordance with the present invention.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 6 includes a number ($N \geq 2$) of processing nodes 8a–8n, which are interconnected by node interconnect 22. Processing nodes 8a–8n may each include M ($M \geq 0$) processors 10, a local interconnect 16, and a system memory 18 that is accessed via a memory controller 17. Processors 10a–10m are preferably (but not necessarily) identical and may comprise a processor within the PowerPC™ line of processors available from International Business Machines (IBM) Corporation of Armonk, N.Y. In addition to the registers, instruction flow logic and execution units utilized to execute program instructions, which are generally designated as processor core 12, each of processors 10a–10m also includes an on-chip cache hierarchy that is utilized to stage data to the associated processor core 12 from system memories 18. Each cache hierarchy 14 may include, for example, a level one (L1) cache and a level two (L2) cache having storage capacities of between 8–32 kilobytes (kB) and 1–16 megabytes (MB), respectively.

Each of processing nodes 8a–8n further includes a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions to remote processing nodes 8. Second, each node controller 20 snoops communication transactions on node interconnect 22 and masters relevant communication transactions on the associated local interconnect 16. Communication on each local interconnect 16 is controlled by an arbiter 24. Arbiters 24 regulate access to local interconnects 16 based on bus request signals generated by processors 10 and compile coherency responses for snooped communication transactions on local interconnects 16, as discussed further below.

Local interconnect 16 is coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a keyboard, a graphical pointer, and serial and parallel ports for connection to external networks or attached devices. Storage devices 34, on the other hand, may include optical or magnetic disks that provide non-volatile storage for operating system and application software.

Memory Organization

All of processors 10 in NUMA computer system 6 share a single physical memory space, meaning that each physical address is associated with only a single location in one of system memories 18. Thus, the overall contents of the system memory, which can generally be accessed by any processor 10 in NUMA computer system 6, can be viewed as partitioned between system memories 18. For example, in an illustrative embodiment of the present invention having four processing nodes 8, NUMA computer system may have a 16 gigabyte (GB) physical address space including both a general purpose memory area and a reserved area. The general purpose memory area is divided into 500 MB segments, with each of the four processing nodes 8 being allocated every fourth segment. The reserved area, which may contain approximately 2 GB, includes system control and peripheral memory and I/O areas that are each allocated to a respective one of processing nodes 8.

For purposes of the present discussion, the processing node 8 that stores a particular datum in its system memory 18 is said to be the home node for that datum; conversely, others of processing nodes 8a–8n are said to be remote nodes with respect to the particular datum.

Memory Coherency

Because data stored within each system memory 18 can be requested, accessed, and modified by any processor 10 within NUMA computer system 6, NUMA computer system 6 implements a cache coherence protocol to maintain coherence both between caches in the same processing node and between caches in different processing nodes. Thus, NUMA computer system 6 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that cache hierarchies 14 and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

Interconnect Architecture

Local interconnects 16 and node interconnect 22 can each be implemented with any bus-based broadcast architecture, switch-based broadcast architecture, or switch-based non-broadcast architecture. However, in a preferred embodiment, at least node interconnect 22 is implemented as a switch-based non-broadcast interconnect governed by the 6xx communication protocol developed by IBM Corporation. Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response—are utilized to convey information between processing nodes 8 via node interconnect 22 and between snoopers via local interconnects 16. Referring now to Tables I and II, a summary of relevant fields and definitions are given for address and data packets, respectively.

TABLE I

| Field Name | Description |
| --- | --- |
| Address <0:7> | Modifiers defining attributes of a communication transaction for coherency, write thru, and protection |
| Address <8:15> | Tag used to identify all packets within a communication transaction |
| Address <16:63> | Address portion that indicates the physical, virtual or I/O address in a request |
| Aparity <0:2> | Indicates parity for address bits <0:63> |
| TDescriptors | Indicate size and type of communication transaction |

TABLE II

| Field Name | Description |
| --- | --- |
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit a recipient node or snooper to determine the communication transaction to which each packet belongs, each packet in a communication transaction is identified with a transaction tag. Those skilled in the art will appreciate that additional flow control logic and associated flow control signals may be utilized to regulate the utilization of the finite communication resources.

Within each processing node 8, status and coherency responses are communicated between each snooper and the local arbiter 24. The signal lines within local interconnects 16 that are utilized for status and coherency communication are summarized below in Table III.

TABLE III

| Signal Name | Description |
| --- | --- |
| AStatOut <0:1> | Encoded signals asserted by each bus receiver to indicate flow control or error information to arbiter |
| AStatIn <0:1> | Encoded signals asserted by arbiter in response to tallying the AStatOut signals asserted by the bus receivers |
| ARespOut <0:2> | Encoded signals asserted by each bus receiver to indicate coherency information to arbiter |
| ARespIn <0:2> | Encoded signals asserted by arbiter in response to tallying the ARespOut signals asserted by the bus receivers |

Status and coherency responses transmitted via the AResp and AStat lines of local interconnects 16 preferably have a fixed but programmable timing relationship with the associated address packets. For example, the AStatOut votes, which provide a preliminary indication of whether or not each snooper has successfully received an address packet transmitted on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V.

TABLE V

| Coherency responses | Meaning |
| --- | --- |
| Retry | Source of request must retry transaction usually for flow control reasons |
| Modified intervention | Line is modified in cache and will be sourced to requestor |
| Shared | Line is held shared in cache |
| Null | Line is invalid in cache |
| ReRun | Snooped request has long latency and source of request will be instructed to reissue transaction at a later time |

The ReRun AResp vote, which is usually issued by a node controller 20, indicates that the snooped request has a long latency and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

Node Controller

Figure 2:
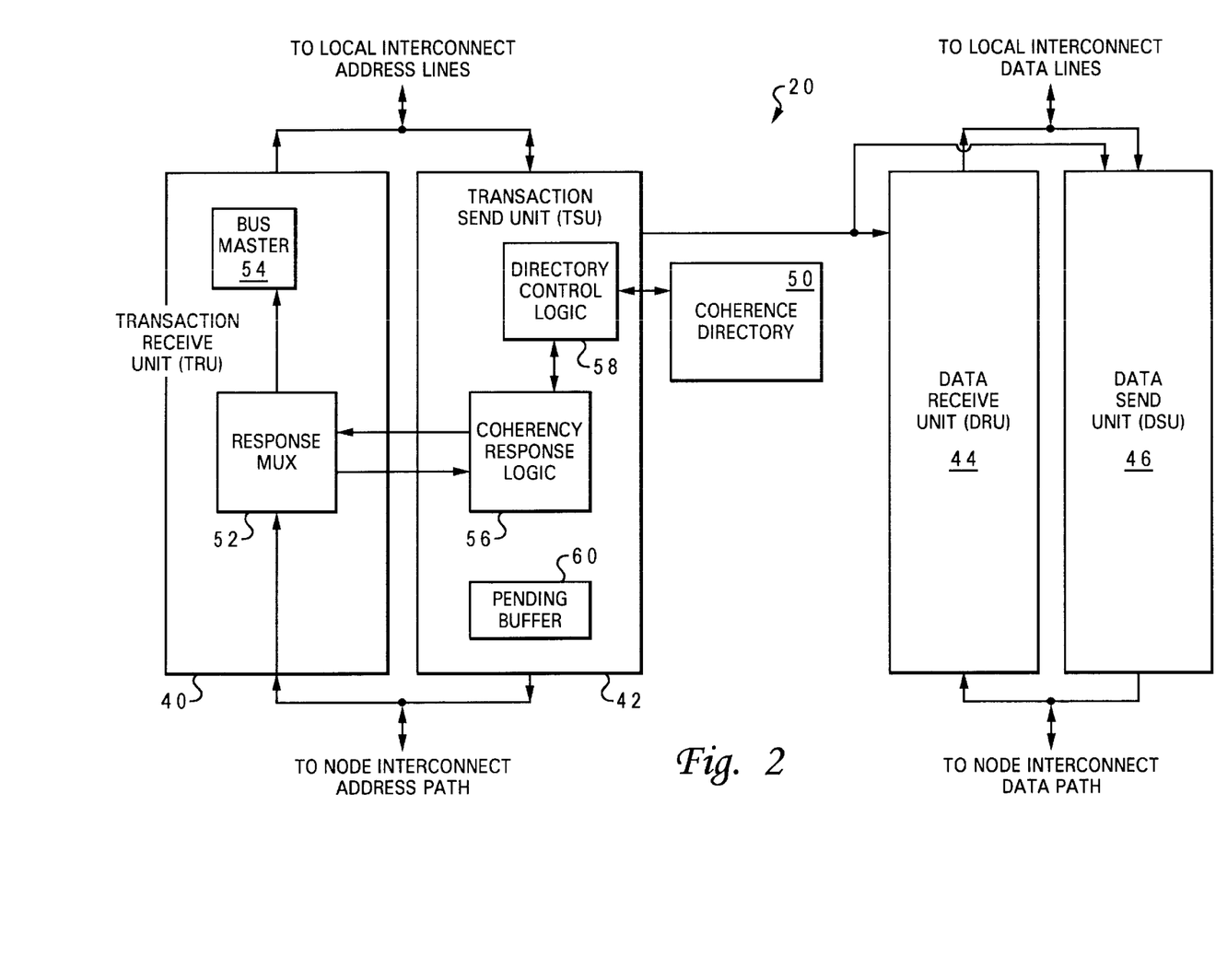
FIG. 2 is a more detailed block diagram of the node controller shown in FIG. 1.

Referring now to FIG. 2, there is illustrated a more detailed block diagram of a node controller 20 in NUMA computer system 6 of FIG. 1. As shown in FIG. 2, each node controller 20, which is coupled between a local interconnect 16 and node interconnect 22, includes a transaction receive unit (TRU) 40, a transaction send unit (TSU) 42, a data receive unit (DRU) 44, and a data send unit (DSU) 46. TRU 40, TSU 42, DRU 44 and DSU 46 can be implemented, for example, with field programmable gate arrays (FPGAs) or application specific integrated circuits (ASICs). As indicated, the address and data paths through node controller 20 are bifurcated, with address (and coherency) packets being processed by TRU 40 and TSU 42 and data packets being processed by DSU 44 and DRU 46.

TRU 40, which is so designated to indicate transaction flow off of node interconnect 22, is responsible for accepting address and coherency packets from node interconnect 22, issuing transactions on local interconnect 16, and forwarding responses to TSU 42. TRU 40 includes response multiplexer (mux) 52, which receives packets from node interconnect 22 and passes selected packets to both bus master 54 and coherency response logic 56 within TSU 42. In response to receipt of a address packet from response multiplexer 52, bus master 54 can initiate a communication transaction on its local interconnect 16 that is the same as or different from the type of communication transaction indicated by the received address packet.

TSU 42, which as indicated by its nomenclature is a conduit for transactions flowing onto node interconnect 22, includes a multiple-entry pending buffer 60 that temporarily stores attributes of communication transactions sourced onto node interconnect 22 that have yet to be completed. The transaction attributes stored in an entry of pending buffer 60 preferably include at least the address (including tag) of the transaction, the type of the transaction, and the number of expected coherency responses. Each pending buffer entry has an associated status, which can be set either to Null, indicating that the pending buffer entry can be deleted, or to ReRun, indicating that the transaction is still pending. In addition to sourcing address packets on node interconnect 22, TSU 42 interacts with TRU 40 to process memory request transactions and issues commands to DRU 44 and DSU 46 to control the transfer of data between local interconnect 16 and node interconnect 22. TSU 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each cache line is stored in association with an identifier of each remote processing node having a copy of the cache line and the coherency status of the cache line at each such remote processing node. Possible coherency states for entries in coherence directory 50 are summarized in Table VI.

TABLE VI

| Coherence directory state | Possible state(s) in local cache | Possible state(s) in remote cache | Meaning |
| --- | --- | --- | --- |
| Modified (M) | I | M, E, or I | Cache line may be modified at a remote node with respect to system memory at home node |
| Shared (S) | S or I | S or I | Cache line may be held non-exclusively at remote node |
| Invalid (I) | M, E, S, or I | I | Cache line is not held by any remote node |
| Pending-shared | S or I | S or I | Cache line is in the process of being invalidated at remote nodes |
| Pending-modified | I | M, E, or I | Cache line, which may be modified remotely, is in process of being written back to system memory at home node, possibly with invalidation at remote node |

As indicated in Table VI, the knowledge of the coherency states of cache lines held by remote processing nodes is imprecise. This imprecision is due to the fact that a cache line held remotely can make a transition from S to I, from E to I, or from E to M without notifying the node controller 20 of the home node.

Processing Read Request Transactions

Figure 3A:
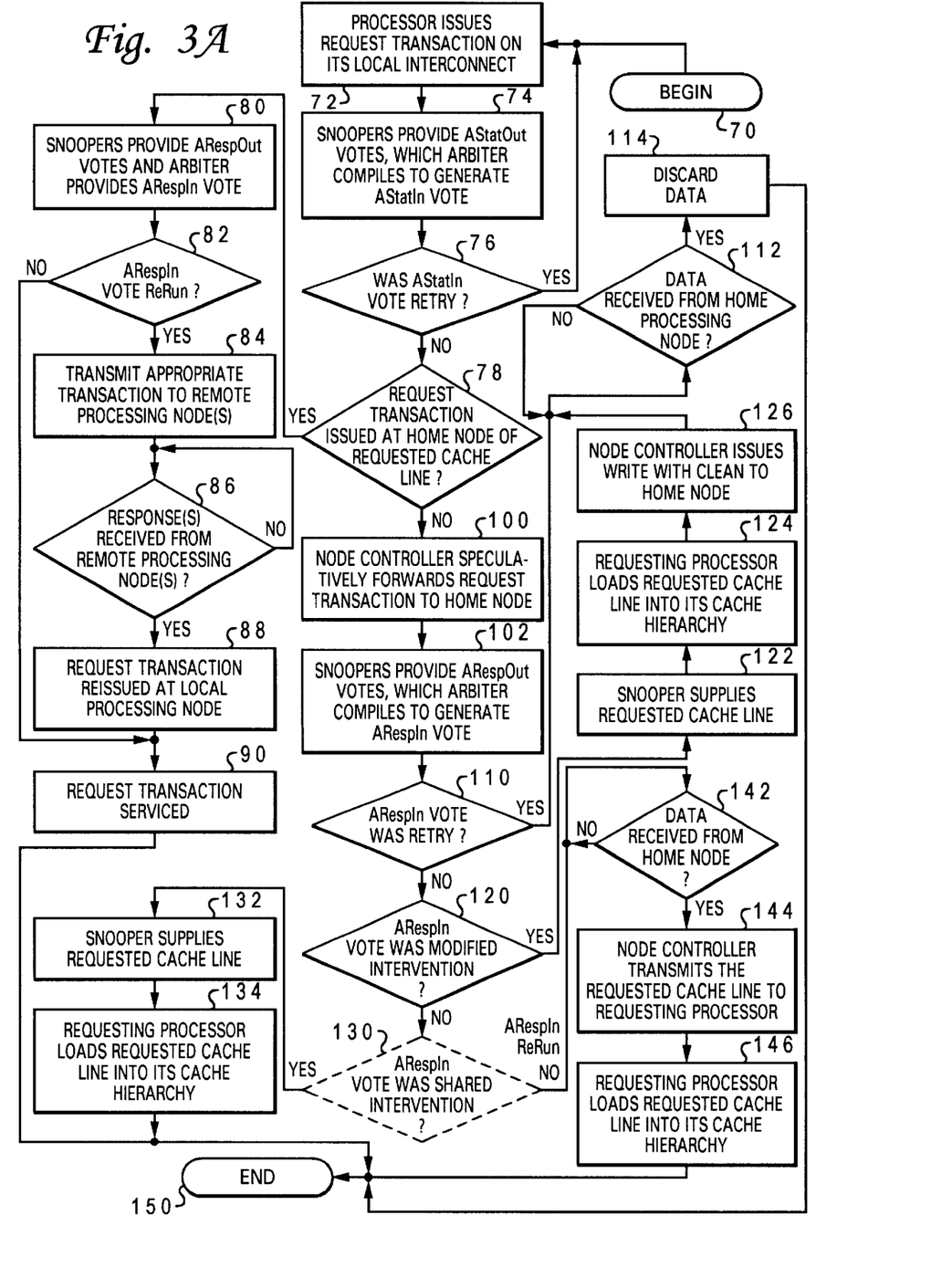
FIGS. 3A and 3B are high level logical flowcharts that together illustrate an exemplary method of processing request transactions in which read requests at a source processing node are speculatively forwarded to a remote processing node.
Figure 3B:
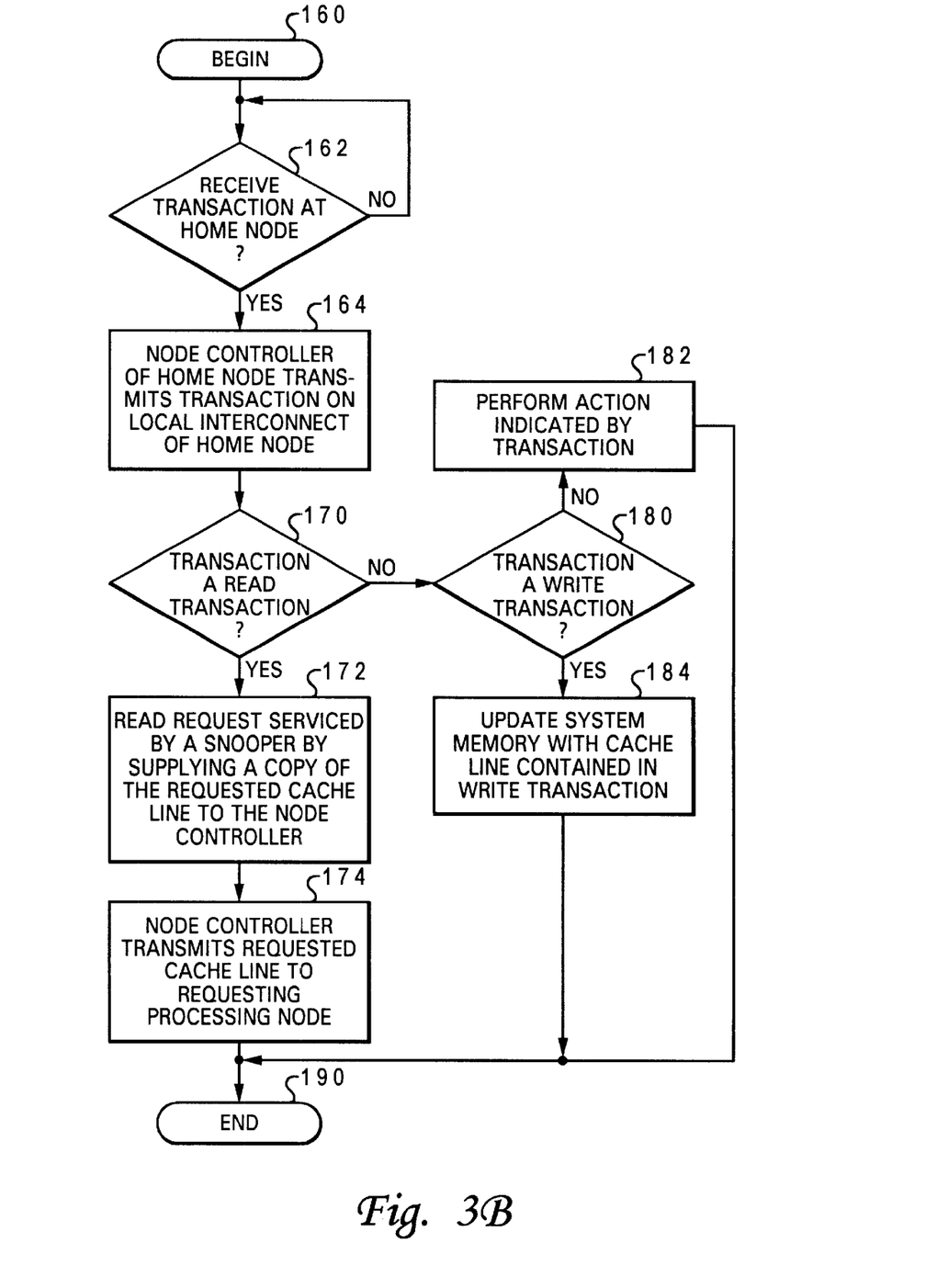

Referring now to FIGS. 3A and 3B, there are illustrated two high level logical flowcharts that together depict an exemplary method for processing read request transactions in accordance with the present invention. Referring first to FIG. 3A, the process begins at block 70 and thereafter proceeds to block 72, which depicts a processor 10, such as processor 10a of processing node 8a, issuing a read request transaction on its local interconnect 16. The read request transaction is received by node controller 20 and the rest of the snoopers coupled to local interconnect 16 of processing node 8a. In response to receipt of the read request, the snoopers drive AStatOut votes, which are compiled by arbiter 24 to generate an AStatIn vote, as shown at block 74. Before node controller 20 supplies an Ack AStatOut vote to permit the read request to proceed, node controller 20 allocates both a read entry and write-with-clean entry in pending buffer 60, if the read request specifies an address in a remote system memory 18. As discussed further below, by allocating both entries, node controller 20 is able to speculatively forward the read request to the home node of the requested cache line and correctly handle the response to the read request regardless of the outcome of the subsequent AResp vote at processing node 8a.

Referring now to block 76, if the AStatIn vote generated at block 74 is Retry, the read request is essentially killed, allocated entries, if any, in pending buffer 60 are freed, and the process returns to block 72, which has been described. In this case, processor 10a must reissue the read request at a later time. If, on the other hand, the AStatIn vote generated at block 74 is not Retry, the process proceeds from block 76 to block 78, which depicts node controller 20 determining by reference to the memory map whether or not its processing node 8 is the home node of the physical address specified in the read request. If so, the process proceeds to block 80; however, if the local processing node 8 is not the home node for the read request, the process proceeds to block 100.

Referring now to block 80, the snoopers within processing node 8a then provide their ARespOut votes, which arbiter 24 compiles to generate an ARespIn vote. If coherency directory 50 indicates that the cache line identified by the address specified in the read request is checked out to at least one remote processing node 8, node controller 20 will vote ReRun if servicing the read request requires communication with a remote processing node 8. For example, if coherency directory 50 indicates that a requested cache line is Modified at a remote processing node 8, servicing a read request will entail forwarding the read request to the remote processing node 8. Similarly, if coherency directory 50 indicates that a requested cache line is Shared at a remote processing node 8, servicing a read-with-intent-to-modify (RWITM) request will entail transmitting a Kill command to the remote processing node 8 to invalidate the remote copy or copies of the requested cache line. As shown at block 82, if the ARespIn vote is not ReRun, the process passes to block 90, which is described below; if the ARespIn vote is ReRun, the process proceeds to block 84.

Block 84 illustrates node controller 20 transmitting, via node interconnect 22, an appropriate transaction to the one or more remote processing nodes 8 that have checked out the requested cache line. As noted above, the transaction may be either a cache command (e.g., Kill) or a read request transaction. The process then iterates at block 86 until a response is received by node controller 20 from each remote processing node 8 to which a transaction was transmitted at block 84. Following receipt of the appropriate number of responses, which may include the receipt of a copy of the requested cache line, node controller 20 transmits a ReRun request on local interconnect 16, instructing requesting processor 10a to reissue the read request. As indicated at block 88, requesting processor 10a responds to the ReRun request by reissuing the read request transaction on local interconnect 16. Following the AStat and AResp periods, the read request is serviced at block 90, either by node controller 20 supplying a copy of the requested cache line received from a remote processing node 8 or by another local snooper in processing node 8*a* (e.g., memory controller 17 or a cache hierarchy 14) sourcing the requested cache line. Thereafter, the process terminates at block 150.

Referring now to block 100, if node controller 20 of processing node 8*a* determines that processing node 8*a* is not the home node for the requested cache line, node controller 20 speculatively forwards the read request transaction to the remote processing node 8 that is the home node for the requested cache line. As indicated in FIG. 3A, the read request is forwarded by node controller 20 at least concurrently with the ARespIn period and is preferably forwarded immediately following receipt of the AStatIn vote from arbiter 24 and prior to the ARespOut period. When the read request is forwarded, the status of the read entry in pending buffer 60 is updated to ReRun. Then, as shown at block 102, the snoopers provide their ARespOut votes, which arbiter 24 compiles to generate a ARespIn vote. Thereafter, as illustrated at block 110 and following blocks, the home node supplies a response to the read request, and node controller 20 handles the response in accordance with the ARespIn vote for the read request at processing node 8*a*.

If the ARespIn vote is Retry, the read request is essentially killed at processing node 8*a*. Thus, in response to a receipt of a ARespIn Retry vote, the status of the read and write entries allocated in pending buffer 60 are updated to Null. The process passes then through block 110 to blocks 112 and 114, which depict node controller 20 waiting to receive the requested cache line from the home node and discarding the cache line when received in response to the Null status of the read entry in pending buffer 60. The process then terminates at block 150.

If the ARespIn vote is Modified Intervention, the read request can be serviced locally at processing node 8*a* without utilizing (stale) data from the home node. Thus, in response to a receipt of a ARespIn Modified Intervention vote, the status of the read entry in pending queue 60 is updated to Null, and the process proceeds from block 102 through blocks 110 and 120 to block 122. Block 122 illustrates the snooper that voted Modified Intervention during the ARespOut period sourcing the requested cache line on local interconnect 16 of processing node 8*a*. The coherency state of the requested cache line at the snooper sourcing the requested cache line is then updated from Modified to Shared. In response to receiving the requested cache line, requesting processor 10*a* loads the requested cache line into its cache hierarchy 14, as illustrated at block 124. In addition, node controller 20 captures the requested cache line off of local interconnect 16 and issues a write-with-clean transaction containing the cache line to the home node in order to update the home node's system memory 18 with the modified cache line, as depicted at block 126. The process then passes to block 112, which has been described.

The coherence protocol implemented by computer system 6 may optionally support shared intervention, that is, the servicing of a read request transaction by a local cache hierarchy 14 that holds the requested cache line in Shared state. If shared intervention is supported by the cache coherence protocol of computer system 6 and the ARespIn vote for the request transaction is Shared (i.e., Shared Intervention), the snooper voting Shared sources the requested cache line on local interconnect 16, as depicted at block 132. In response to receiving the requested cache line, requesting processor 10*a* loads the requested cache line into its cache hierarchy 14, as illustrated at block 134. As no update to system memory 18 is required, the status of the read and write entries allocated in pending buffer 60 are updated to Null, and the process terminates at block 150.

Finally, if the ARespIn vote for the request transaction at processing node 8*a* is ReRun, the status of the write entry in pending buffer 60 is updated to Null and that of the read entry is set to ReRun. The process then proceeds from block 102 through blocks 110, 120, 130 to block 142, which depicts node controller 20 of processing node 8*a* waiting until the requested cache line is received from the home node. In response to receipt of the requested cache line from the home node via node interconnect 22, node controller 20 transmits the requested cache line to requesting processor 10*a* via local interconnect 16, as shown at block 144. In response to receipt of the requested cache line, requesting processor 10*a* loads the requested cache line into its cache hierarchy 14, as illustrated at block 146. The process then terminates at block 150.

Referring now to FIG. 3B, there is depicted a high level logical flowchart illustrating how the home node processes a transaction received from another processing node. As illustrated, the process begins at block 160 and thereafter proceeds to block 162, which illustrates a determination of whether or not the home node has received a transaction from another processing node via node interconnect 22. If not, the process simply iterates at block 162 until a transaction is received from another processing node 8. In response to receipt by the home node's node controller 20 of a transaction from a remote processing node 8, the process passes to block 164, which depicts the home node's node controller 20 transmitting the transaction received at block 162 on the local interconnect 16 of the home node. As indicated by decision block 170, if the transaction issued on local interconnect 16 is a read transaction, the process proceeds to block 172, which illustrates the read request being serviced by a snooper that supplies a copy of the requested cache line to the home node's node controller 20. In response to receipt of the requested cache line, node controller 20 transmits the requested cache line to the requesting processing node 8 via node interconnect 22, as depicted at block 174. Thereafter, the process terminates at block 190.

Returning to block 164, if the transaction transmitted on the home node's local interconnect 16 is a write (e.g., write-with-clean) transaction, the process proceeds through blocks 170 and 180 to block 184, which illustrates memory controller 17 updating system memory 18 with the cache line contained in the write transaction. The process then terminates at block 190. If the transaction transmitted on the home node's local interconnect 16 is neither a read transaction nor a write transaction, the home node performs the action(s) indicated by the transaction at block 182, and the process terminates at block 190. The actions that may be performed in response to a transaction other than a read or write transaction include, for example, updates to the coherence states of cache lines held in the home node's cache hierarchies 14.

Referring now to FIGS. 4A–4D, there is depicted an exemplary processing scenario in accordance with the present invention. For clarity, the exemplary processing scenario is explained below utilizing a simplified representation of computer system 6 having two processing nodes 8*a* and 8*b*, which each contain two processors 10*a* and 10*b*. The coherence state of the requested cache line is indicated within the cache hierarchy 14 of each processor 10 and within coherence directory 50 of home node 8*a*.

Figure 4A:
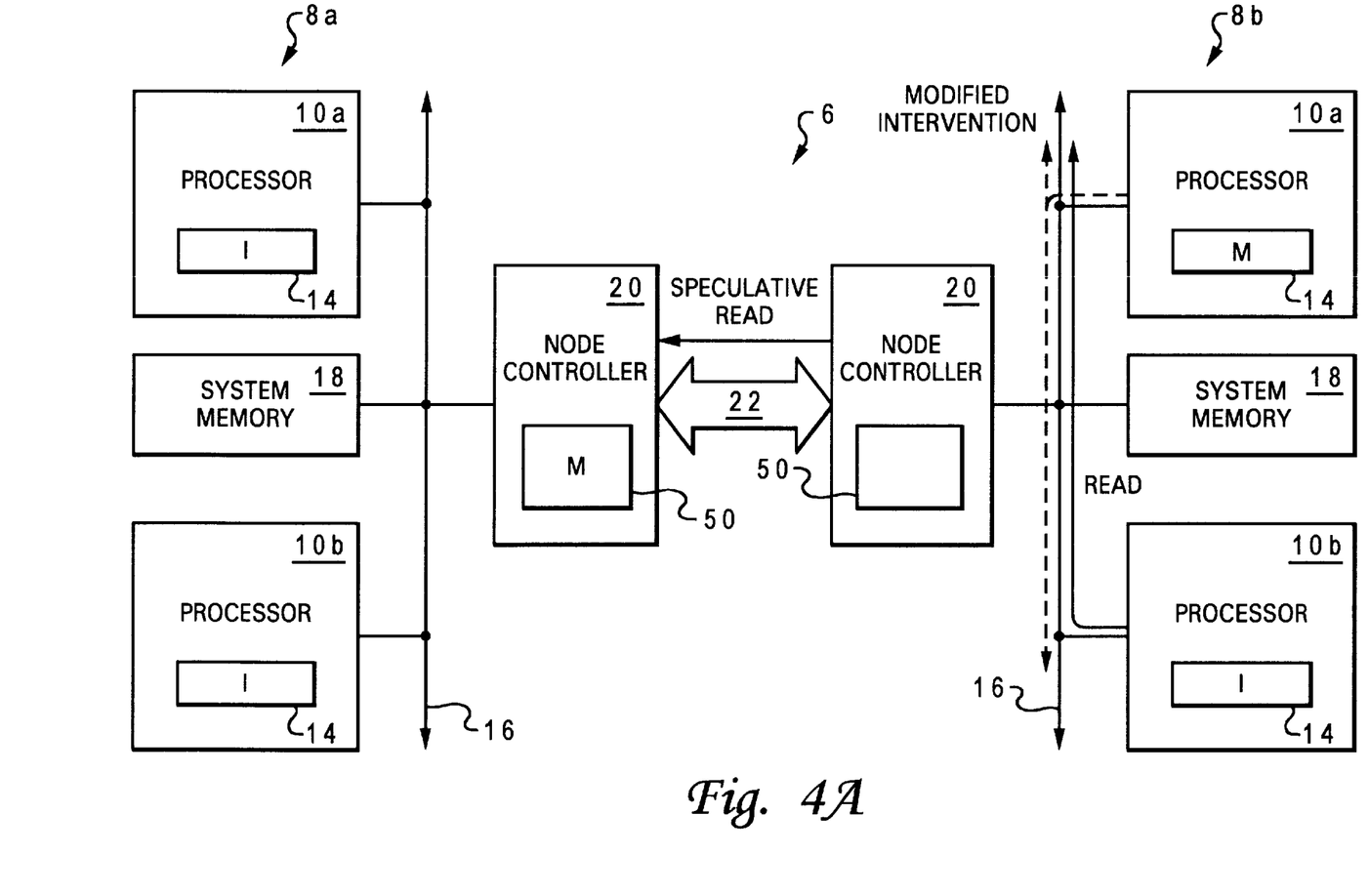
FIGS. 4A–4D together illustrate an exemplary processing scenario in accordance with the method depicted in FIGS. 3A and 3B.

As indicated in FIG. 4A, processor 10b of processing node 8b first issues a read request for a cache line that is Invalid (i.e., not resident) in its cache hierarchy 14. In response to receiving the read request, node controller 20 of processing node 8b speculatively transmits the read request to processing node 8a, which is the home node of the cache line specified in the read request. After the read request is speculatively forwarded to processing node 8a, processor 10a votes Modified Intervention during the ARespOut period because its cache hierarchy 14 holds the requested cache line in Modified state. The arbiter of processing node 8b compiles the ARespOut votes and supplies a Modified Intervention ARespIn vote to each snooper in processing node 8b.

Figure 4B:
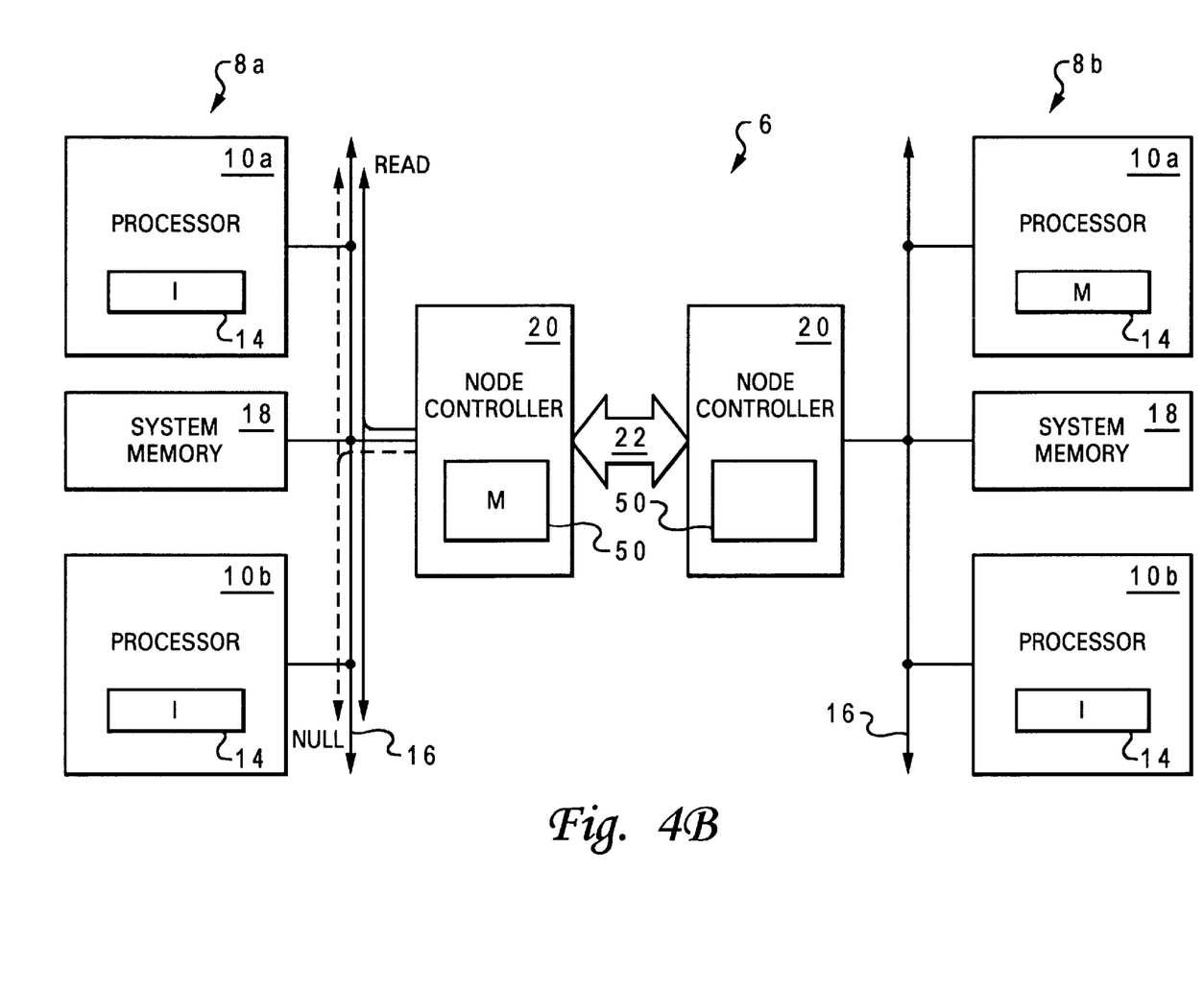

Next, as shown in FIG. 4B, node controller 20 of processing node 8a receives the speculatively forwarded read request and issues the read request on its local interconnect 16. As indicated in FIG. 4B, node controller 20 votes Null during the ARespOut period in response to coherence directory 50 indicating that the cache line specified in the read request is Modified at processing node 8b. Node controller 20 recognizing this special condition permits the read request to proceed, as discussed below with respect to FIG. 4D.

Figure 4C:
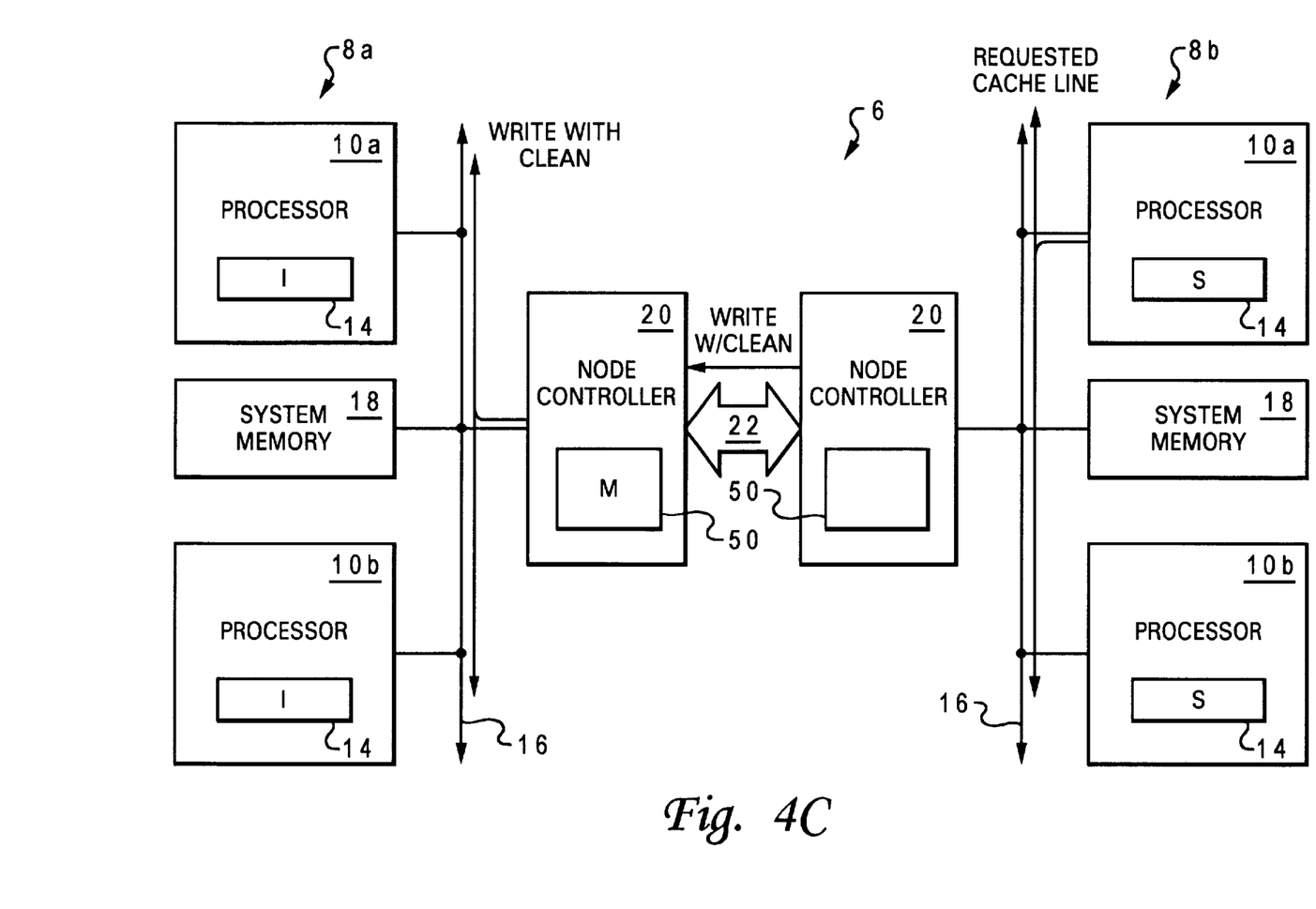

As illustrated in FIG. 4C, independently of (and possibly prior to, concurrently with, or after) the speculative forwarding of the read request to processing node 8a, processor 10a of processing node 8b responds to the read request by sourcing the requested cache line on local interconnect 16 and updating the coherence state of the requested cache line in its cache hierarchy 14 to Shared. In response to snooping the requested cache line, requesting processor 10b loads the requested cache line into its cache hierarchy 14 and sets the associated coherence state to Shared. In addition, node controller 20 of processing node 8b captures the cache line and issues a write-with-clean transaction containing the modified cache line to processing node 8a. In response to receipt of the write-with-clean transaction, node controller 20 of processing node 8a issues the write-with-clean to system memory 18 via its local interconnect 16. System memory 18 of home node 8a then updates the corresponding memory line with the modified data.

Figure 4D:
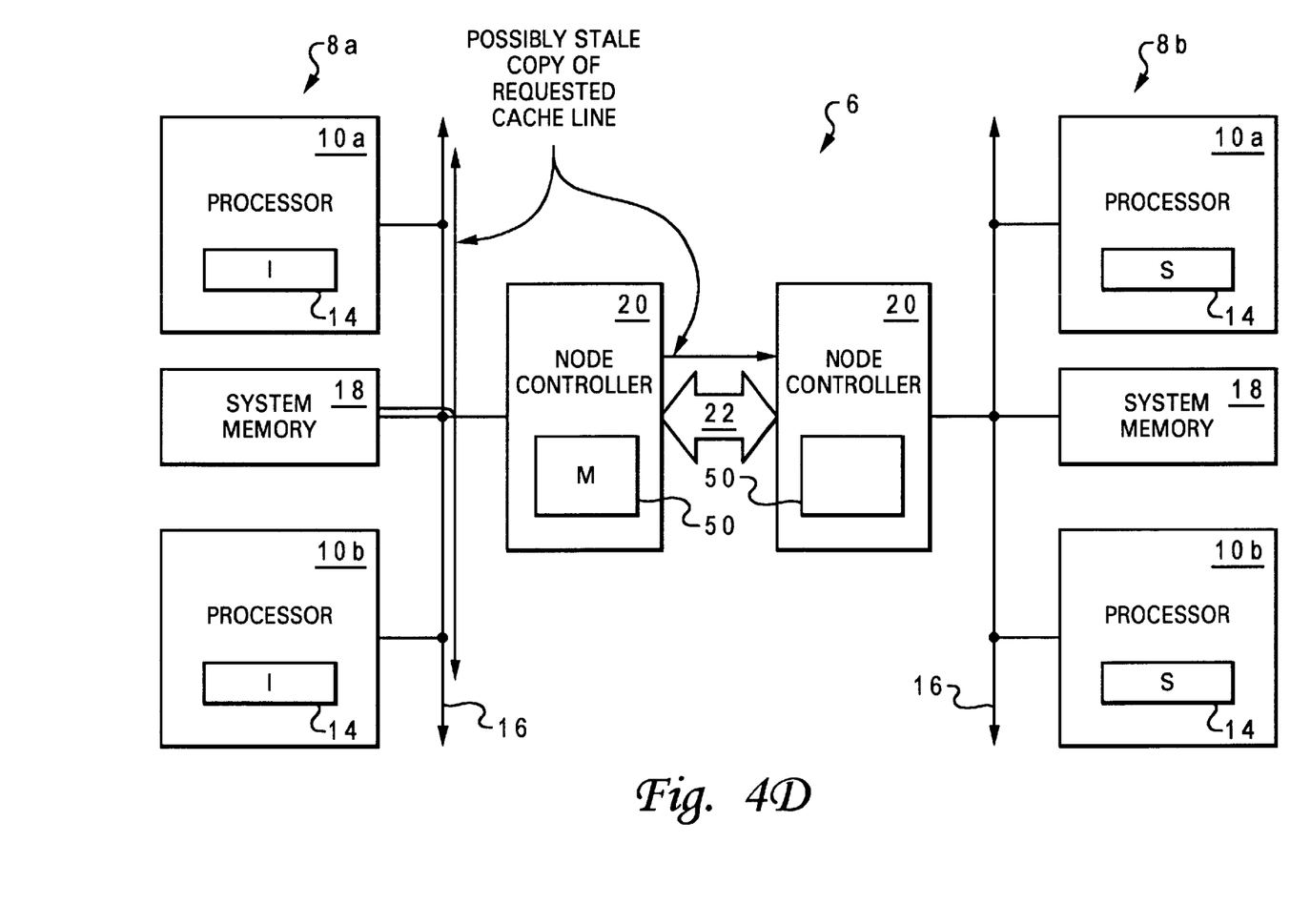

Referring now to FIG. 4D, independently of (and possibly prior to, concurrently with, or after) the memory update illustrated in FIG. 4A, system memory 18 of processing node 8a responds to the read request by sourcing a possibly stale copy of the requested cache line to node controller 20 of processing node 8a via local interconnect 16. Node controller 20 of processing node 8a then forwards the copy of the requested cache line to node controller 20 of processing node 8b, which discards the cache line in response to the read request being marked Null in its pending buffer 60.

As has been described, the present invention provides an improved NUMA computer system and an improved communication methodology in a NUMA computer system. In accordance with the present invention, a read request transaction is speculatively issued to a remote (i.e., home) processing node via the node interconnect prior to a determination of whether the read request can be serviced locally without the intervention of the remote processing node. When the remote processing node responds to the speculatively forwarded read request, the requesting processing node handles the response in accordance with the local coherence response for the read request. In this manner, the latency of communication transactions can be dramatically reduced.

While the invention has been particularly shown and described with reference to a preferred embodiment, it will be understood by those skilled in the art that various changes in form and detail may be made therein without departing from the spirit and scope of the invention.

What is claimed is:

1. A computer system, comprising:
 a node interconnect; and
 at least a local node and a remote node that are each coupled to said node interconnect, said local node including a local interconnect and said local and remote nodes each including one or more snoopers, wherein said one or more snoopers of said local node include a node controller interposed between said local interconnect and said node interconnect, wherein said node controller speculatively transmits a request transaction received from said local interconnect to said remote node via said node interconnect prior to determination of a local node response, wherein snoopers at the local node and the remote node independently process the request transaction to obtain the local node response at the local node and a remote node response at the remote node, and wherein said node controller of the local node handles the remote node response to said request transaction in accordance with the local node response.

2. The computer system of claim 1, wherein said remote node further comprises a local interconnect and a node controller interposed between said node interconnect and said local interconnect, wherein in response to receipt of said speculative request transaction, said node controller of said remote node issues said speculative request transaction on said local interconnect of said remote node.

3. The computer system of claim 1, wherein:
 said computer system further comprises a third node;
 said request transaction includes an address; and
 said node controller of said local node determines a target node of said speculatively transmitted request transaction from among said remote node and said third node at least partially in response to said address included in said request transaction.

4. The computer system of claim 3, wherein said node controller sends said speculatively transmitted request transaction only to said target node.

5. The computer system of claim 4, wherein said node controller of said local node discards data received from said remote node in response to said request transaction if said local node response includes a modified or shared intervention coherency response.

6. The computer system of claim 1, said remote node including a system memory, wherein said node controller of said local node speculatively forwards said request transaction to said remote in response to a determination that said request transaction specifies an address associated with said system memory at said remote node.

7. The computer system of claim 1, wherein said node controller of said local node sources data received from said remote node onto said local interconnect of said local node if said local node response indicates that said request transaction cannot be serviced locally.

8. The computer system of claim 1, wherein snoopers at said local node and said remote node process said request transaction with independent timing.

9. The computer system of claim 1, wherein said node controller of said local node discards data received from said remote node in response to said request transaction if said local node response indicates that said request transaction can be serviced at said local node.

10. A method of operation in a computer system including a node interconnect that couples at least a local node and a remote node that each contain one or more snoopers, wherein said one or more snoopers at said local node include a node controller interposed between a local interconnect of the local node and said node interconnect, said method comprising:

speculatively transmitting a request transaction received from said local interconnect to said remote node via said node interconnect prior to determination of a local node response;

independently processing the request transaction by snoopers of the local node and snoopers of the remote node to obtain the local node response at the local node and a remote node response at the remote node;

transmitting the remote node response to the local node; and in response to receipt at said local node of the remote node response, handling the remote node response in accordance with the local node response.

11. The method of claim 10, and further comprising:

in response to receipt of said speculative request transaction at said remote node, issuing said speculative request transaction on a local interconnect of said remote node.

12. The method of claim 10, wherein said computer system further includes a third node and said request transaction includes an address, said method further comprising:

determining a target node of said speculatively transmitted request transaction from among said remote node and said third node at least partially in response to said address included in said request transaction.

13. The method of claim 12, and further comprising in response to determination of the target node, sending said speculatively transmitted request transaction from the local node only to said target node.

14. The method of claim 10, said remote processing node including a system memory, wherein speculatively transmitting a request transacting comprises speculatively transmitting said request transaction to said remote processing node in response to a determination that said request transaction specifies an address associated with said system memory at said remote processing node.

15. The method of claim 10, wherein handling said response comprises sourcing data received from said remote processing node onto said local interconnect of said local processing node if said request transaction receives a coherency response at said local processing node indicating that said request transaction cannot be serviced locally.

16. The method of claim 10, wherein snoopers at said local node and said remote node process said request transaction with independent timing.

17. The method of claim 10, wherein handling the remote node response comprises discarding data received from said remote node in response to said request transaction if said local node response indicates that said request transaction can be serviced at said local node.

18. The method of claim 17, wherein handling said remote node response comprises discarding data received from said remote node if said local node response includes a modified or shared intervention coherency response.

19. A node for a computer system having multiple nodes, said node comprising:

a local interconnect; and one or more snoopers coupled to the local interconnect, wherein said one or more snoopers include a node controller providing an interface for a node interconnect for interconnecting multiple nodes, wherein said node controller speculatively transmits a request transaction received from said local interconnect to the node interconnect prior to determination of a local node response by the one or more snoopers, and wherein the node controller handles a remote node response to said request transaction received from the node interconnect in accordance with the local node response.

20. The node of claim 19, wherein:

the multiple nodes include at least three nodes;

the request transaction includes an address; and said node controller determines a target node of said speculatively transmitted request transaction from among said multiple nodes at least partially in response to said address included in said request transaction.

21. The node of claim 20, wherein said node controller sends said speculatively transmitted request transaction via said node interconnect only to said target node.

22. The node of claim 19, wherein said node controller discards data received from said node interconnect in response to said request transaction if said local node response indicates that said request transaction can be serviced in said node.

23. The node of claim 22, wherein said node controller discards data received from said node interconnect in response to said request transaction if said local node response includes a modified or shared intervention coherency response.

24. The node of claim 19, wherein said node controller sources data received from said node interconnect in response to said request transaction onto said local interconnect if said local node response indicates that said request transaction cannot be serviced locally.

* * * * *